US009278390B2

(12) United States Patent
Whitcomb (10) Patent No.: US 9,278,390 B2
(45) Date of Patent: *Mar. 8, 2016

(54) NANOWIRE PREPARATION METHODS, COMPOSITIONS, AND ARTICLES

(75) Inventor: David R. Whitcomb, Oakdale, MN (US)

(73) Assignee: Carestream Health, Inc., Rochester, NY (US)

( * ) Notice: Subject to any disclaimer, the term of this patent is extended or adjusted under 35 U.S.C. 154(b) by 685 days.

This patent is subject to a terminal disclaimer.

(21) Appl. No.: 13/290,062

(22) Filed: Nov. 5, 2011

(65) Prior Publication Data

US 2012/0148438 A1     Jun. 14, 2012

Related U.S. Application Data

(60) Provisional application No. 61/421,284, filed on Dec. 9, 2010, provisional application No. 61/423,741, filed on Dec. 16, 2010.

(51) Int. Cl.
| | |
|---|---|
| *B22F 9/18* | (2006.01) |
| *B82Y 40/00* | (2011.01) |
| *B22F 1/00* | (2006.01) |
| *B22F 9/24* | (2006.01) |
| *B82Y 30/00* | (2011.01) |
| *C22C 1/04* | (2006.01) |
| *C22C 5/06* | (2006.01) |

(52) U.S. Cl.
CPC ............... *B22F 1/0025* (2013.01); *B22F 9/24* (2013.01); *B82Y 30/00* (2013.01); *C22C 1/0466* (2013.01); *C22C 5/06* (2013.01); *B22F 2998/00* (2013.01)

(58) Field of Classification Search
CPC ............ B22F 1/0044; B22F 9/06; B22F 9/18; B82Y 40/00
USPC ........................................................ 75/371
See application file for complete search history.

(56) References Cited

U.S. PATENT DOCUMENTS 6,645,444 B2 *   11/2003   Goldstein ..................... 423/1
2012/0301350 A1 *   11/2012   Whitcomb ................. 420/501

FOREIGN PATENT DOCUMENTS

| CN | 101934377 | 9/2010 |
| CN | 102029400 | 11/2010 |
| JP | 2009155674 | 7/2009 |

OTHER PUBLICATIONS http://en.wikipedia.org/wiki/Aluminium_chloride, Jan. 2013.*
Tang et al. Syntheses of silver nanowires in liquid phase, Nanowires Science and Technology, Feb. 2010, p. 25-42.*
Y. Xia et al., "Shape-Controlled Synthesis of Metal Nanocrystals: Simple Chemistry Meets Complex Physics?", Nanostructures, Angew. Chem. Int. Ed., 2009, vol. 48, pp. 60-103.
J. Jiu et al., "Preparation of Ag nanorods with high yield by polyol process", Materials Chemistry and Physics, vol. 114, 2009, pp. 333-338.

(Continued)

*Primary Examiner* — Jie Yang
*Assistant Examiner* — Xiaowei Su
(74) *Attorney, Agent, or Firm* — Reed L. Christiansen (57) ABSTRACT

Nanomaterial preparation methods, compositions, and articles are disclosed and claimed. Such methods can provide nanomaterials with improved morphologies relative to previous methods. Such materials are useful in electronic applications.

3 Claims, 5 Drawing Sheets

(56) References Cited

OTHER PUBLICATIONS

S. Nandikonda, "Microwave Assisted Synthesis of Silver Nanorods", Auburn, Alabama, Aug. 9, 2010, 59 pages.

S. Nandikonda et al., "Effects of Salt Selection on the Rapid Synthesis of Silver Nanowires", Abstract INOR0299, 240th ACS National Meeting, Boston, MA, Aug. 22-27, 2010, 1 page.

Y.C. Lu et al., "Tailoring of silver wires and their performance as transparent conductive coatings", Nanotechnology, vol. 21, 2010, 215707, pp. 1-6.

Yi He, et al., "Fabrication of two-dimensional staggered silver nanosheets on an aluminum foil," Nanotechnology, vol. 16, No. 6, 2005, pp. 791-795, XP020091086.

International Search Report for International Patent Application No. PCT/US2011/059492 mailed Apr. 3, 2013, 5 pages.

* cited by examiner

NANOWIRE PREPARATION METHODS, COMPOSITIONS, AND ARTICLES

CROSS REFERENCE TO RELATED APPLICATIONS

This application claims the benefit of U.S. Provisional Application No. 61/421,284, filed Dec. 9, 2010, entitled NON-REDOX ACTIVE METAL ION CATALYSIS OF METAL ION REDUCTION, METHODS, COMPOSITIONS, AND ARTICLES; and U.S. Provisional Application No. 61/423,741, filed Dec. 16, 2010, entitled METAL ION CATALYSIS OF METAL ION REDUCTIONS, METHODS, COMPOSITIONS, AND ARTICLES; each of which is hereby incorporated by reference in its entirety.

BACKGROUND

The general preparation of silver nanowires (10-200 aspect ratio) is known. See, for example, *Angew. Chem. Int. Ed.* 2009, 48, 60, Y. Xia, Y. Xiong, B. Lim, S. E. Skrabalak, which is hereby incorporated by reference in its entirety. Such preparations typically employ $Fe^{2+}$ or $Cu^{2+}$ ions to "catalyze" the wire formation over other morphologies. The controlled preparation of silver nanowires having the desired lengths and widths, however, is not known. For example, the $Fe^{2+}$ produces a wide variety of lengths or thicknesses and the $Cu^{2+}$ produces wires that are too thick for many applications.

The metal ions used to catalyze wire formation are generally primarily reported to be provided as a metal halide salt, usually as a metal chloride, for example, $FeCl_2$ or $CuCl_2$. See, for example, J. Jiu, K. Murai, D. Kim, K. Kim, K. Suganuma, *Mat. Chem. & Phys.*, 2009, 114, 333, which refers to NaCl, $CoCl_2$, $CuCl_2$, $NiCl_2$ and $ZnCl_2$; Japanese patent application publication JP2009155674, which describes $SnCl_4$; S. Nandikonda, "Microwave Assisted Synthesis of Silver Nanorods," M. S. Thesis, Auburn University, Aug. 9, 2010, which refers to NaCl, KCl, $MgCl_2$, $CaCl_2$, $MnCl_2$, $CuCl_2$, and $FeCl_3$; S. Nandikonda and E. W. Davis, "Effects of Salt Selection on the Rapid Synthesis of Silver Nanowires," Abstract INOR-299, 240th ACS National Meeting, Boston, Mass., Aug. 22-27, 2010, which discloses NaCl, KCl, $MgCl_2$, $CaCl_2$, $MnCl_2$, $CuCl_2$, $FeCl_3$, $Na_2S$, and NaI; Chinese patent application publication CN101934377, which discloses $Mn^{2+}$; Y. C. Lu, K. S. Chou, *Nanotech.*, 2010, 21, 215707, which discloses $Pd^{2+}$; and Chinese patent application publication CN102029400, which discloses NaCl, $MnCl_2$, and $Na_2S$.

SUMMARY

At least some embodiments provide methods comprising providing a composition comprising at least one first reducible metal ion and at least one second non-redox active metal or metal ion, the at least one second non-redox active metal or metal ion differing in atomic number from the at least one first reducible metal ion; and reducing the at least one first reducible metal ion to at least one first metal.

In at least some embodiments, the at least one first reducible metal ion may comprise one or more of at least one coinage metal ion, at least one ion of an element from IUPAC Group 11, or at least one silver ion.

In some cases, the at least one second non-redox active metal or metal ion may comprise at least one element or an ion of an element in its +3 oxidation state, such as, for example elements from IUPAC Group 13 other than indium or an ion of indium. In other embodiments, the at least one second non-redox active metal or metal ion may comprise at least one element or ion of an element from IUPAC Group 2. For example, the at least one second non-redox active metal or metal ion may comprise one or more of aluminum, an ion of aluminum, strontium, or an ion of strontium.

Other embodiments provide the at least one first metal produced according to such methods.

Still other embodiments provide metal nanowires comprising the at least one first metal produced according to such methods. In some cases, the metal nanowires may comprise an aspect ratio between about 50 and about 10,000. Such nanowires may comprise an average diameter of between about 10 nm and about 500 nm, or of between about 25 nm and about 260 nm. An exemplary metal nanowire is a silver nanowire.

Yet still other embodiments provide articles comprising the at least one first metal produced according to such methods. Such articles may, for example, comprise at least one of an electronic display, a touch screen, a portable telephone, a cellular telephone, a computer display, a laptop computer, a tablet computer, a point-of-purchase kiosk, a music player, a television, an electronic game, an electronic book reader, a transparent electrode, a solar cell, a light emitting diode, an electronic device, a medical imaging device, or a medical imaging medium.

These embodiments and other variations and modifications may be better understood from the brief description of figures, description, exemplary embodiments, examples, figures, and claims that follow. Any embodiments provided are given only by way of illustrative example. Other desirable objectives and advantages inherently achieved may occur or become apparent to those skilled in the art. The invention is defined by the appended claims.

DESCRIPTION

All publications, patents, and patent documents referred to in this document are incorporated by reference herein in their entirety, as though individually incorporated by reference.

U.S. Provisional Application No. 61/421,284, filed Dec. 9, 2010, entitled NON-REDOX ACTIVE METAL ION CATALYSIS OF METAL ION REDUCTION, METHODS, COMPOSITIONS, AND ARTICLES; and U.S. Provisional Application No. 61/423,741, filed Dec. 16, 2010, entitled METAL ION CATALYSIS OF METAL ION REDUCTIONS, METHODS, COMPOSITIONS, AND ARTICLES, are both hereby incorporated by reference in their entirety.

Reducible Metal Ions and Metal Products

Some embodiments provide methods comprising reducing at least one reducible metal ion to at least one metal. A reducible metal ion is a cation that is capable of being reduced to a metal under some set of reaction conditions. In such methods, the at least one first reducible metal ion may, for example, comprise at least one coinage metal ion. A coinage metal ion is an ion of one of the coinage metals, which include copper, silver, and gold. Or such a reducible metal ion may, for example, comprise at least one ion of an IUPAC Group 11 element. An exemplary reducible metal ion is a silver cation. Such reducible metal ions may, in some cases, be provided as salts. For example, silver cations might, for example, be provided as silver nitrate.

In such embodiments, the at least one metal is that metal to which the at least one reducible metal ion is capable of being reduced. For example, silver would be the metal to which a silver cation would be capable of being reduced.

These methods are also believed to be applicable to reducible metal cations other than silver cations, including, for example reducible cations of other IUPAC Group 11 elements, reducible cations of other coinage metals, and the like. These methods may also be used to prepare products other than nanowires, such as, for example, nanocubes, nanorods, nanopyramids, nanotubes, and the like. Such products may be incorporated into articles, such as, for example, transparent electrodes, solar cells, light emitting diodes, other electronic devices, medical imaging devices, medical imaging media, and the like.

Non-Redox Active Metals or Metal Ions

Non-redox active metals are metals that do not undergo spontaneous oxidation or reduction while present during reduction of the reducible metal cation. In some embodiments, non-redox active metals have a 3+ oxidation state, such as, for example, the elements or ions of elements of IUPAC Group 13, except for indium and ions of indium. In other embodiments, non-redox active metals comprise the elements or ions of elements of IUPAC Group 2. Exemplary second non-redox active metals or metal ions are aluminum, ions of aluminum, strontium, or ions of strontium.

Nanostructures, Nanostructures, Nanowires, and Articles

In some embodiments, the metal product formed by such methods is a nanostructure, such as, for example, a one-dimensional nanostructure. Nanostructures are structures having at least one "nanoscale" dimension less than 300 nm. Examples of such nanostructures are nanorods, nanowires, nanotubes, nanopyramids, nanoprisms, nanoplates, and the like. "One-dimensional" nanostructures have one dimension that is much larger than the other two nanoscale dimensions, such as, for example, at least about 10 or at least about 100 or at least about 200 or at least about 1000 times larger.

Such one-dimensional nanostructures may, in some cases, comprise nanowires. Nanowires are one-dimensional nanostructures in which the two short dimensions (the thickness dimensions) are less than 300 nm, preferably less than 100 nm, while the third dimension (the length dimension) is greater than 1 micron, preferably greater than 10 microns, and the aspect ratio (ratio of the length dimension to the larger of the two thickness dimensions) is greater than five. Nanowires are being employed as conductors in electronic devices or as elements in optical devices, among other possible uses. Silver nanowires are preferred in some such applications.

The compositions and methods of the present application allow tailoring of nanowire diameters. In some cases, nanowires may be thin or thick. Thin nanowires can be useful in applications where transparency is important, while thick nanowires can be useful in applications requiring high current densities. Such nanowires may, for example, comprise an average diameter of between about 10 nm and about 500 nm, or of between about 25 nm and about 260 nm, or of between about 25 nm and about 60 nm, or of between about 140 nm and about 260 nm.

Such methods may be used to prepare nanostructures other than nanowires, such as, for example, nanocubes, nanorods, nanopyramids, nanotubes, and the like. Nanowires and other nanostructure products may be incorporated into articles, such as, for example, electronic displays, touch screens, portable telephones, cellular telephones, computer displays, laptop computers, tablet computers, point-of-purchase kiosks, music players, televisions, electronic games, electronic book readers, transparent electrodes, solar cells, light emitting diodes, other electronic devices, medical imaging devices, medical imaging media, and the like.

Preparation Methods

A common method of preparing nanostructures, such as, for example, nanowires, is the "polyol" process. Such a process is described in, for example, *Angew. Chem. Int. Ed.* 2009, 48, 60, Y. Xia, Y. Xiong, B. Lim, S. E. Skrabalak, which is hereby incorporated by reference in its entirety. Such processes typically reduce a metal cation, such as, for example, a silver cation, to the desired metal nanostructure product, such as, for example, a silver nanowire. Such a reduction may be carried out in a reaction mixture that may, for example, comprise one or more polyols, such as, for example, ethylene glycol (EG), propylene glycol, butanediol, glycerol, sugars, carbohydrates, and the like; one or more protecting agents, such as, for example, polyvinylpyrrolidinone (also known as polyvinylpyrrolidone or PVP), other polar polymers or copolymers, surfactants, acids, and the like; and one or more metal ions. These and other components may be used in such reaction mixtures, as is known in the art. The reduction may, for example, be carried out at one or more temperatures from about 120° C. to about 190° C., or from about 80° C. to about 190° C.

Exemplary Embodiments

U.S. Provisional Application No. 61/421,284, filed Dec. 9, 2010, entitled NON-REDOX ACTIVE METAL ION CATALYSIS OF METAL ION REDUCTION, METHODS, COMPOSITIONS, AND ARTICLES, which is hereby incorporated by reference in its entirety, disclosed the following 29 non-limiting exemplary embodiments:

A. A method comprising:
  providing a composition including:
    at least one first compound comprising at least one first reducible metal ion,
    at least one second compound comprising at least one second non-redox active metal or metal ion, said at least one second non-redox active metal or metal ion differing in atomic number from said at least one first reducible metal ion, and
    at least one solvent; and
  reducing the at least one first reducible metal ion to at least one first metal.

B. The method of embodiment A, wherein the composition further comprises at least one protecting agent.

C. The method of embodiment B, wherein the at least one protecting agent comprises at least one of: one or more surfactants, one or more acids, or one or more polar polymers.

D. The method of embodiment B, wherein the at least one protecting agent comprises polyvinylpyrrolidinone.

E. The method of embodiment B, further comprising inerting the at least one protecting agent.

F. The method of embodiment A, wherein the at least one first reducible metal ion comprises at least one coinage metal ion.

G. The method of embodiment A, wherein the at least one first reducible metal ion comprises at least one ion of an element from IUPAC Group 11.

H. The method of embodiment A, wherein the at least one first reducible metal ion comprises at least one ion of silver.

J. The method of embodiment A, wherein the at least one first compound comprises silver nitrate.

K. The method of embodiment A, wherein the at least one second non-redox active metal or metal ion comprises at least one element or an ion of an element that has a 3+ oxidation state.

L. The method of embodiment A, wherein the at least one second non-redox active metal or metal ion comprises at least one element from IUPAC Group 13 or an ion of an element from IUPAC Group 13.

M. The method of embodiment A, wherein the at least one second non-redox active metal or metal ion comprises aluminum or an ion of aluminum.

N. The method of embodiment A, wherein the at least one second compound comprises at least one salt of said at least one second metal or metal ion.

P. The method of embodiment N, wherein the at least one salt comprises at least one chloride.

Q. The method of embodiment A, wherein the at least one solvent comprises at least one polyol.

R. The method of embodiment A, wherein the at least one solvent comprises at least one of: ethylene glycol, propylene glycol, glycerol, one or more sugars, or one or more carbohydrates.

S. The method of embodiment A, wherein the composition has a ratio of the total moles of the at least one second metal or metal to the moles of the at least one first reducible metal ion from about 0.0001 to about 0.1.

T. The method of embodiment A, wherein the reduction is carried out at one or more temperatures from about 120° C. to about 190° C.

U. The method of embodiment A, further comprising inerting one or more of: the composition, the at least one compound comprising at least one first reducible metal ion, the at least one second metal or metal ion, or the at least one solvent.

V. The at least one first metal produced according to the method of embodiment A.

W. At least one article comprising the at least one first metal produced according to the method of embodiment A.

X. The at least one article of embodiment W, wherein the at least one first metal comprises one or more nanowires, nanocubes, nanorods, nanopyramids, or nanotubes.

Y. The at least one article of embodiment W, wherein the at least one first metal comprises at least one object having an average diameter of between about 10 nm and about 500 nm.

Z. The at least one article of embodiment W, wherein the at least one first metal comprises at least one object having an aspect ratio from about 50 to about 10,000.

AA. At least one metal nanowire with an average diameter of between about 10 nm and about 150 nm, and with an aspect ratio from about 50 to about 10,000.

AB. The nanowire of embodiment AA, wherein the at least one metal comprises at least one coinage metal.

AC. The nanowire of embodiment AA, wherein the at least one metal comprises at least one element of IUPAC Group 11.

AD. The nanowire of embodiment AA, wherein the at least one metal comprises silver.

AE. At least one article comprising the at least one metal nanowire of embodiment AA.

U.S. Provisional Application No. 61/423,741, filed Dec. 16, 2010, entitled METAL ION CATALYSIS OF METAL ION REDUCTIONS, METHODS, COMPOSITIONS, AND ARTICLES, which is hereby incorporated by reference in its entirety, disclosed the following 27 non-limiting exemplary embodiments:

AF. A method comprising:
  providing a composition including:
    at least one first compound comprising at least one first reducible metal ion,
    at least one second compound comprising at least one second metal or metal ion differing in atomic number from said at least one first reducible metal, said at least one second metal or metal ion comprising at least one element from IUPAC Group 2, and
    at least one solvent; and
  reducing the at least one first reducible metal ion to at least one first metal.

AG. The method of embodiment AF, wherein the composition further comprises at least one protecting agent.

AH. The method of embodiment AG, wherein the at least one protecting agent comprises at least one of: one or more surfactants, one or more acids, or one or more polar polymers.

AJ. The method of embodiment AG, wherein the at least one protecting agent comprises polyvinylpyrrolidinone.

AK. The method of embodiment AG, further comprising inerting the at least one protecting agent.

AL. The method of embodiment AF, wherein the at least one first reducible metal ion comprises at least one coinage metal ion.

AM. The method of embodiment AF, wherein the at least one first reducible metal ion comprises at least one ion of an element from IUPAC Group 11.

AN. The method of embodiment AF, wherein the at least one first reducible metal ion comprises at least one ion of silver.

AP. The method of embodiment AF, wherein the at least one first compound comprises silver nitrate.

AQ. The method of embodiment AF, wherein the at least one second metal or metal ion comprises strontium or an ion of strontium.

AR. The method of embodiment AF, wherein the at least one second compound comprises at least one salt of said at least one second metal or metal ion.

AS. The method of embodiment AR, wherein the at least one salt comprises at least one chloride.

AT. The method of embodiment AF, wherein the at least one solvent comprises at least one polyol.

AU. The method of embodiment AF, wherein the at least one solvent comprises at least one of: ethylene glycol, propylene glycol, glycerol, one or more sugars, or one or more carbohydrates.

AV. The method of embodiment AF, wherein the composition has a ratio of the total moles of the at least one second metal or metal to the moles of the at least one first reducible metal ion from about 0.0001 to about 0.1.

AW. The method of embodiment AF, wherein the reduction is carried out at one or more temperatures from about 120° C. to about 190° C.

AX. The method of embodiment AF, further comprising inerting one or more of: the composition, the at least one compound comprising at least one first reducible metal ion, the at least one second metal or metal ion, or the at least one solvent.

AY. At least one first metal produced according to the method of embodiment AF.

AZ. At least one article comprising the at least one first metal produced according to the method of embodiment AF.

BA. The at least one article of embodiment AZ, wherein the at least one first metal comprises one or more nanowires, nanocubes, nanorods, nanopyramids, or nanotubes.

BB. The at least one article of embodiment AZ, wherein the at least one first metal comprises at least one object having an average diameter of between about 10 nm and about 500 nm.

BC. The at least one article of embodiment AZ, wherein the at least one first metal comprises at least one object having an aspect ratio from about 50 to about 10,000.

BD. At least one metal nanowire with an average diameter of between about 10 nm and about 150 nm, and with an aspect ratio from about 50 to about 10,000.

BE. The nanowire of embodiment BD, wherein the at least one metal comprises at least one coinage metal.

BF. The nanowire of embodiment BD, wherein the at least one metal comprises at least one element of IUPAC Group 11.

BG. The nanowire of embodiment BD, wherein the at least one metal comprises silver.

BH. At least one article comprising the at least one metal nanowire of embodiment BD.

EXAMPLES

Example 1

To a 500 mL reaction flask was added 280 mL ethylene glycol (EG) and 1.3 g of freshly prepared 15 mM $AlCl_3.6H_2O$ in EG. This solution was stripped of at least some dissolved gases by bubbling $N_2$ into the solution for at least 2 hrs using a glass pipette at room temperature with mechanical stirring while at 100 rpm. (This operation will be referred to as "degassing" the solution in the sequel.) Stock solutions of 0.25 M $AgNO_3$ in EG and 0.77 M polyvinylpyrrolidinone (PVP) in EG were also degassed by bubbling $N_2$ into the solutions for 60 minutes. Two syringes were loaded with 20 mL each of the $AgNO_3$ and PVP solutions. The reaction mixture was heated to 155° C. under $N_2$ and the $AgNO_3$ and PVP solutions were added at a constant rate over 25 minutes via 12 gauge TEFLON® fluoropolymer syringe needles. The reaction was held at 155° C. for 90 minutes then allowed to cool to room temperature. From the cooled mixture, the reaction mixture was diluted by an equal volume of acetone, and centrifuged at 500 G for 45 minutes. The decanted solid was re-dispersed in 200 mL isopropanol, shaken 10 minutes and centrifuged again, decanted and diluted with 15 mL isopropanol.

Figure 1:
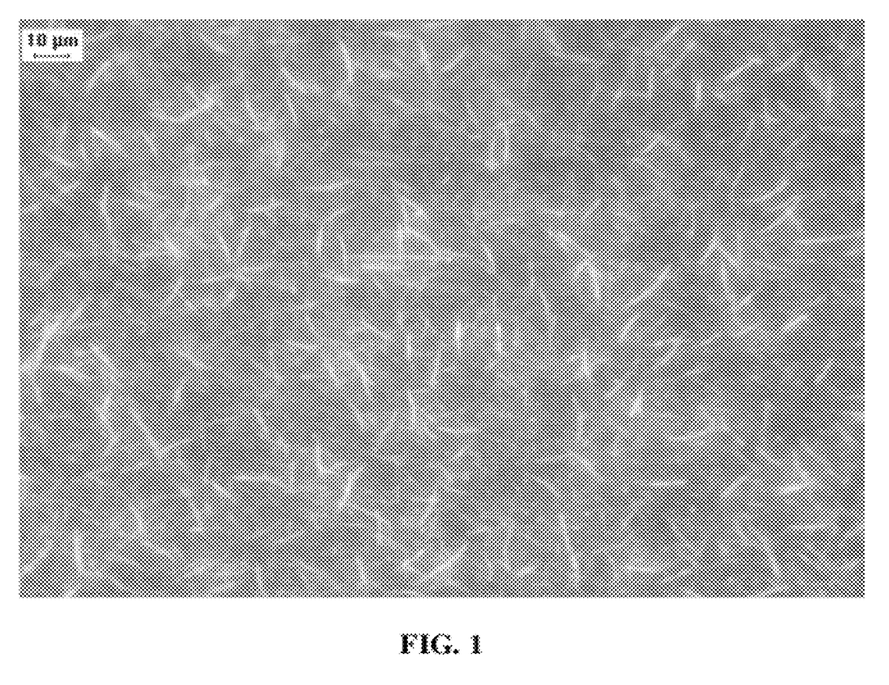
FIG. 1 shows an optical micrograph of the silver nanowire product of Example 1.

FIG. 1 shows an optical micrograph of the silver nanowire product.

Example 2

To a 500 mL reaction flask was added 280 mL ethylene glycol (EG) and 1.3 g of 16 mM $SrCl_2.6H_2O$ in EG. This solution was degassed for 2 hrs by bubbling $N_2$ into the solution using a glass pipette at room temperature with mechanical stirring while at 100 rpm. Stock solutions of 0.25 M $AgNO_3$ in EG and 0.77 M polyvinylpyrrolidinone (PVP) in EG were also degassed by bubbling $N_2$ into the solutions for 60 minutes. Two syringes where loaded with 20 mL each of the $AgNO_3$ and PVP solutions. The reaction mixture was heated to 155° C. under $N_2$ and the $AgNO_3$ and PVP solutions were added at a constant rate over 25 minutes via 12 gauge Teflon syringe needles. The reaction was held at 145° C. for 90 minutes then allowed to cool to room temperature. From the cooled mixture, the reaction mixture was diluted by an equal volume of acetone, and centrifuged at 400 G for 45 minutes. The decanted solid was re-dispersed in 200 mL isopropanol, shaken 10 minutes and centrifuged again, decanted and diluted with 15 mL isopropanol.

Figure 2:
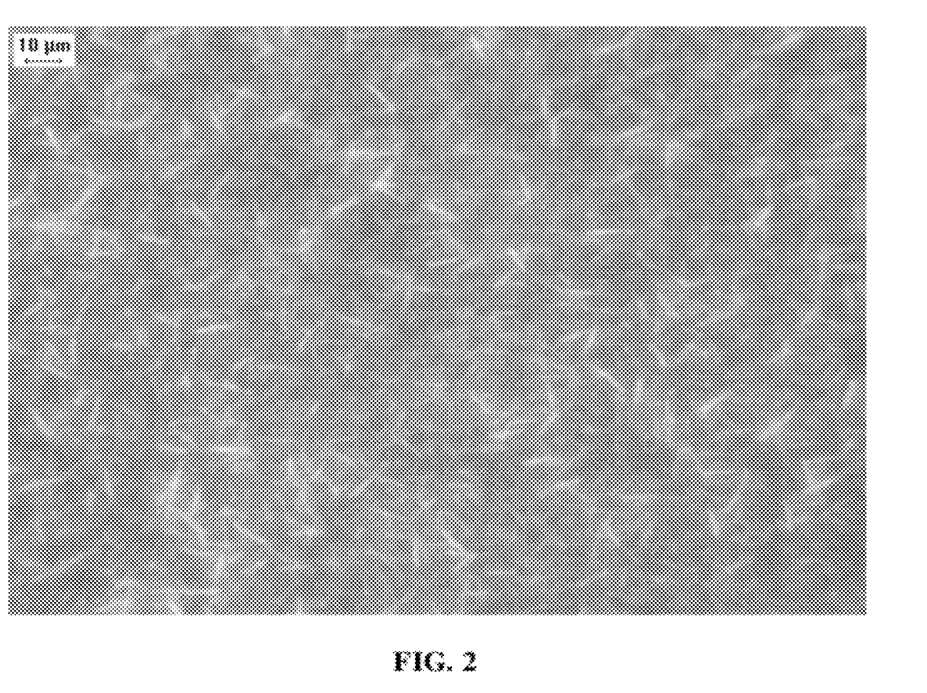
FIG. 2 shows an optical micrograph of the silver nanowire product of Example 2.

An optical micrograph of the silver nanowires, with very few microparticles, is shown in FIG. 2.

Example 3

Comparative

To a 500 mL reaction flask was added 280 mL ethylene glycol (EG) and 1.4 g of a freshly prepared 15 mM $IrCl_3.3H_2O$ dispersion in EG. This solution was degassed for 2 hrs by bubbling $N_2$ into the solution using a glass pipette at room temperature with mechanical stirring while at 100 rpm. Stock solutions of 0.25 M $AgNO_3$ in EG and 0.84 M polyvinylpyrrolidinone (PVP) in EG were also degassed by bubbling $N_2$ into the solutions for at least 60 minutes. Two syringes were loaded with 20 mL each of the $AgNO_3$ and PVP solutions. The reaction mixture was heated to 155° C. under $N_2$ and the $AgNO_3$ and PVP solutions were added at a constant rate over 25 minutes via 12 gauge TEFLON® fluoropolymer syringe needles. The reaction was held at 155° C. for 90 minutes then allowed to cool to room temperature.

Figure 3:
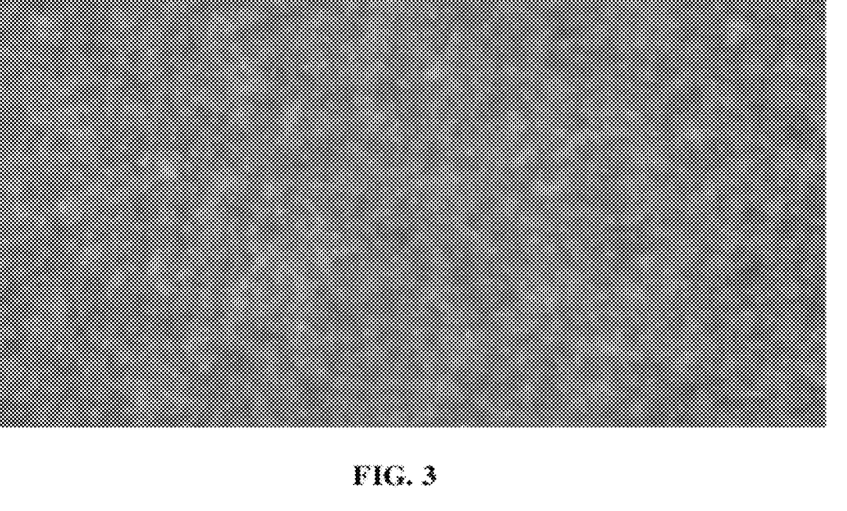
FIG. 3 shows an optical micrograph of the reaction product of comparative Example 3.

FIG. 3 shows the reaction mixture after 60 min of reaction. Visible are nanoparticles, microparticles, with only a few short nanowires.

Example 4

Comparative

The procedure of Example 3 was repeated, using 2.9 g of a freshly prepared 7.0 mM dispersion of $K_2IrCl_4$ in EG, instead of the $IrCl_3.3H_2O$ dispersion. The reaction was carried out at 145° C., instead of 155° C.

Figure 4:
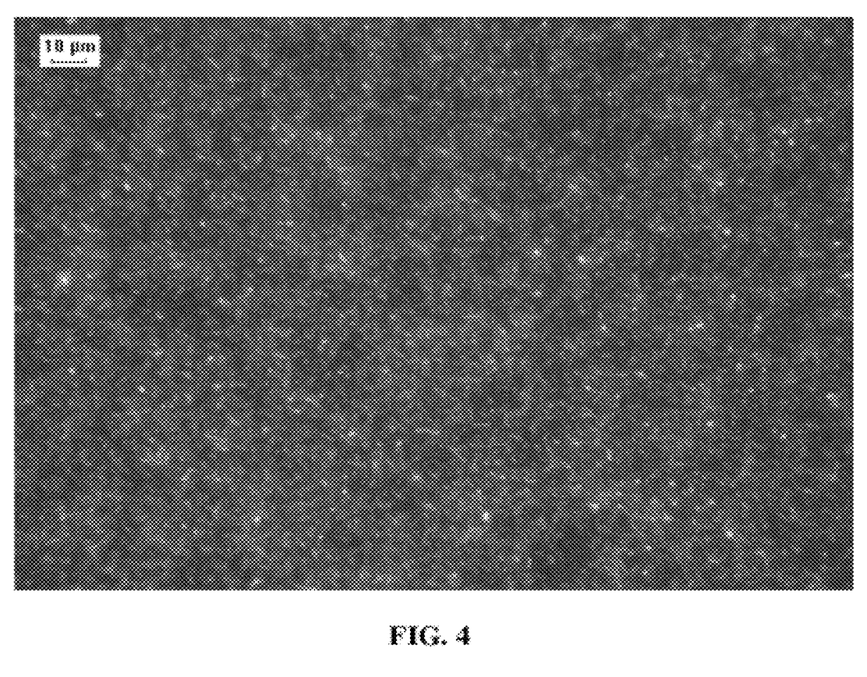
FIG. 4 shows an optical micrograph of the reaction product of comparative Example 4.

FIG. 4 shows the reaction mixture after 90 min of reaction. Only a few fine nanowires are visible.

Example 5

Comparative

The procedure of Example 3 was repeated, using 2.3 g of a freshly prepared 7.0 mM dispersion of $InCl_3.4H_2O$ in EG, instead of the $IrCl_3.3H_2O$ dispersion.

Figure 5:
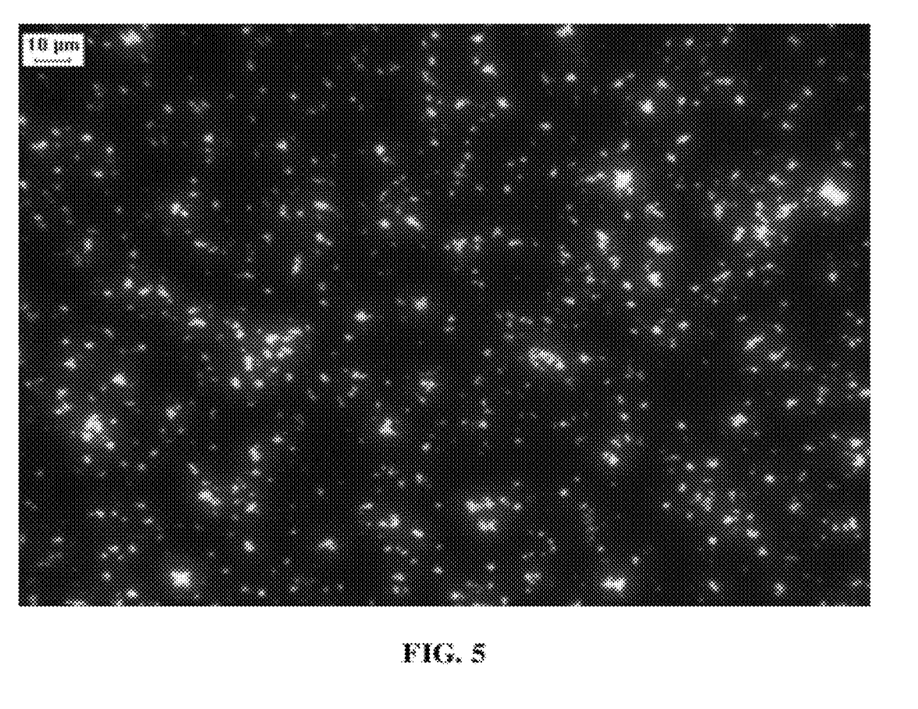
FIG. 5 shows an optical micrograph of the reaction product of comparative Example 5.

FIG. 5 shows the reaction mixture after 90 min of reaction. No nanowires are visible.

Example 6

Comparative

To a 100 mL reaction flask was added 50 mL ethylene glycol (EG) and 0.29 g of 7.0 mM $AuCl_3$ in EG. This solution was degassed for 2 hrs by bubbling $N_2$ into the solution using a glass pipette at room temperature with mechanical stirring while at 100 rpm. Stock solutions of 0.25 M $AgNO_3$ in EG and 0.84 M polyvinylpyrrolidinone (PVP) in EG were also degassed by bubbling $N_2$ into the solutions for at least 60 minutes. Two syringes were loaded with 3 mL each of the $AgNO_3$ and PVP solutions. The reaction mixture was heated to 145° C. under $N_2$ and the $AgNO_3$ and PVP solutions were added at a constant rate over 25 minutes via 20 gauge TEFLON® fluoropolymer syringe needles. The reaction was held at 145° C. for 150 minutes then allowed to cool to room temperature.

Samples taken after 15, 30, 60, 90, 120, and 150 min of reaction appeared to have only nanoparticles, but no nanowires.

The invention has been described in detail with reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced within.

What is claimed:

1. A method comprising:
providing a composition comprising at least one silver ion and at least one second non-redox active metal or metal ion, the at least one second non-redox active metal or metal ion differing in atomic number from the at least one silver ion and comprising at least one ion or element from International Union of Pure and Applied Chemistry (IUPAC) Group 13 other than indium or an ion of indium; and
reducing the at least one silver ion to at least one first silver nanowire,
wherein the ratio of the total moles of the at least one second non-redox active metal or metal ion to the total moles of the at least one silver ion is from about 0.0001 to about 0.1.

2. The method according to claim 1, wherein the at least one second non-redox active metal or metal ion comprises at least one element or an ion of an element in its +3 oxidation state.

3. The method according to claim 1, wherein the at least one second non-redox active metal or metal ion comprises aluminum or an ion of aluminum.

* * * * *